(12) United States Patent
Li et al.

(10) Patent No.: US 6,976,904 B2
(45) Date of Patent: Dec. 20, 2005

(54) CHEMICAL MECHANICAL POLISHING SLURRY

(75) Inventors: Chou H. Li, West Orange, NJ (US); Suzanne C. Li, Short Hill, NJ (US)

(73) Assignee: Li Family Holdings, Ltd., S. Pasadena, FL (US)

( * ) Notice: Subject to any disclaimer, the term of this patent is extended or adjusted under 35 U.S.C. 154(b) by 240 days.

(21) Appl. No.: 10/262,086

(22) Filed: Sep. 30, 2002

(65) Prior Publication Data

US 2003/0077995 A1  Apr. 24, 2003

Related U.S. Application Data

(63) Continuation-in-part of application No. 10/146,137, filed on May 16, 2002, now Pat. No. 6,676,492, which is a continuation-in-part of application No. 09/391,596, filed on Sep. 8, 1999, now Pat. No. 6,458,017, which is a continuation-in-part of application No. 09/112,182, filed on Jul. 9, 1998, now abandoned.

(51) Int. Cl.[7] ................................................. B24B 1/00
(52) U.S. Cl. ........................... 451/28; 451/36; 451/41; 451/60; 451/285; 451/286; 451/287; 451/446
(58) Field of Search .............................. 451/28, 36, 41, 451/60, 285, 286, 287, 446

(56) References Cited

U.S. PATENT DOCUMENTS

| | | |
|---|---|---|
| 2,163,407 A | 6/1939 | Pulfrich |
| 2,570,248 A | 10/1951 | Kelley |
| 2,667,432 A | 2/1954 | Nolte |
| 2,708,787 A | 5/1955 | Chick et al. |
| 3,215,555 A | 11/1965 | Krey |
| 3,281,309 A | 10/1966 | Ross |
| 3,428,845 A | 2/1969 | Rigden et al. |
| 3,448,319 A | 6/1969 | Louden |
| 3,452,310 A | 6/1969 | Israelson |
| 3,574,579 A | 4/1971 | Clarke |
| 3,576,221 A * | 4/1971 | Hasiba ........................ 175/66 |
| 3,650,714 A | 3/1972 | Farkas |
| 3,740,822 A | 6/1973 | Singleton |
| 3,753,758 A | 8/1973 | Shanley |
| 3,777,220 A | 12/1973 | Tstusko et al. |
| 3,901,772 A | 8/1975 | Guillotin et al. |
| 3,915,369 A | 10/1975 | Schnidt-Bruecken et al. |
| 3,949,263 A | 4/1976 | Harper |
| 4,009,027 A | 2/1977 | Naidich et al. |
| 4,018,576 A | 4/1977 | Lowder et al. |
| 4,075,364 A | 2/1978 | Panzera |
| 4,109,031 A | 8/1978 | Marscher |
| 4,111,572 A | 9/1978 | Noone et al. |
| 4,239,502 A | 12/1980 | Slack et al. |
| 4,252,856 A | 2/1981 | Sara |
| 4,294,009 A | 10/1981 | Quintin et al. |

(Continued)

OTHER PUBLICATIONS

Appl. No. 09/361,209, Li et al, filed Jul. 27, 1999

(Continued)

*Primary Examiner*—Shantese L. McDonald

(57) ABSTRACT

A liquid suspension for planarizing an outer surface of a material comprises a liquid suspension medium of a specific liquid density; and a plurality of solid, contact-sensitive abrasive particles of a constant solid density and suspended in the liquid suspension medium. The liquid and solid densities are approximately the same so that the abrasive particles freely and stably suspend in the liquid suspension medium, without gravitational separation by settling down or floating up. In this way, damaging contacts of the solid abrasive particles with one another are minimized.

48 Claims, 1 Drawing Sheet

U.S. PATENT DOCUMENTS

| | | |
|---|---|---|
| 4,338,380 A | 7/1982 | Erickson et al. |
| 4,347,089 A | 8/1982 | Loehman |
| 4,348,131 A | 9/1982 | Shimanuki et al. |
| 4,372,037 A | 2/1983 | Scapple et al. |
| 4,396,677 A | 8/1983 | Intrater et al. |
| 4,404,262 A | 9/1983 | Watmough |
| 4,529,836 A | 7/1985 | Powers et al. |
| 4,529,857 A | 7/1985 | Meek et al. |
| 4,556,389 A | 12/1985 | Ueno et al. |
| 4,593,851 A | 6/1986 | Skog |
| 4,608,226 A | 8/1986 | Lauvinerie et al. |
| 4,624,403 A | 11/1986 | Kohno et al. |
| 4,703,884 A | 11/1987 | Landingham et al. |
| 4,732,780 A | 3/1988 | Mitoff et al. |
| 4,735,866 A | 4/1988 | Moorhead |
| 4,750,914 A | 6/1988 | Chikaoka et al. |
| 4,776,862 A | 10/1988 | Wiand |
| 4,851,615 A | 7/1989 | Butt |
| 4,890,783 A | 1/1990 | Li |
| 4,899,922 A | 2/1990 | Slutz et al. |
| 4,924,033 A | 5/1990 | Iyogi et al. |
| 4,953,499 A | 9/1990 | Anthony et al. |
| 4,958,592 A | 9/1990 | Anthony et al. |
| 4,968,326 A | 11/1990 | Wiand |
| 4,970,986 A | 11/1990 | Anthony et al. |
| 5,022,801 A | 6/1991 | Anthony et al. |
| 5,110,579 A | 5/1992 | Anthony et al. |
| 5,116,787 A | 5/1992 | Dumbaugh, Jr. |
| 5,125,557 A | 6/1992 | Tanaka et al. |
| 5,143,523 A | 9/1992 | Matarrese |
| 5,161,728 A | 11/1992 | Li |
| 5,190,823 A | 3/1993 | Anthony et al. |
| 5,230,924 A | 7/1993 | Li |
| 5,248,079 A | 9/1993 | Li |
| 5,273,731 A | 12/1993 | Anthony et al. |
| 5,349,922 A | 9/1994 | Anthony et al. |
| 5,377,522 A | 1/1995 | Anthony et al. |
| 5,392,982 A | 2/1995 | Li |
| 5,419,276 A | 5/1995 | Anthony et al. |
| 5,419,798 A | 5/1995 | Anthony et al. |
| 5,424,096 A | 6/1995 | Anthony et al. |
| 5,451,430 A | 9/1995 | Anthony et al. |
| 5,464,665 A | 11/1995 | Anthony et al. |
| 5,481,795 A | 1/1996 | Hatakeyama et al. |
| 5,551,277 A | 9/1996 | Anthony et al. |
| 5,573,607 A | 11/1996 | Weaver |
| 5,573,985 A | 11/1996 | Weaver |
| 5,582,540 A | 12/1996 | Su et al. |
| 5,755,614 A | 5/1998 | Adams et al. |
| 5,874,175 A | 2/1999 | Li |
| 5,932,348 A | 8/1999 | Li |
| 5,937,514 A | 8/1999 | Li |
| 6,286,206 B1 | 9/2001 | Li |
| 6,384,342 B1 | 5/2002 | Li |
| 6,413,589 B1 | 7/2002 | Li |
| 6,458,017 B1 | 10/2002 | Li et al. |
| 6,676,492 B2 | 1/2004 | Li |

OTHER PUBLICATIONS

Appl. No. 09/461,405, Li et al, filed Dec. 13, 1999.
U.S. Appl. No. 09/361,209, filed Jul. 27, 1999, Li et al.
U.S. Appl. No. 09/461,405, filed Dec. 15, 1999, Li et al.

* cited by examiner

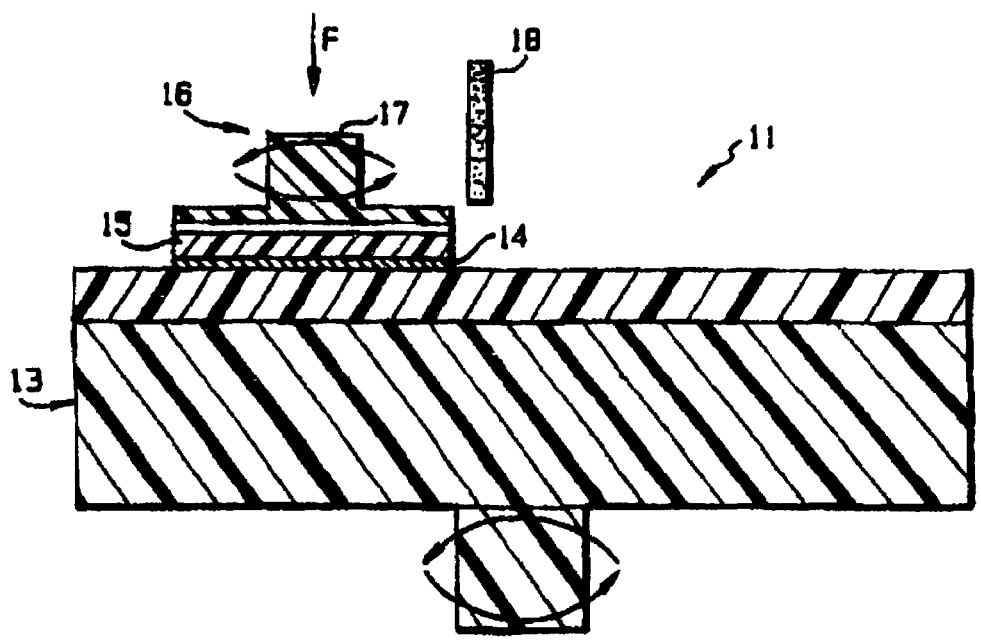
FIG.1
FIG.2
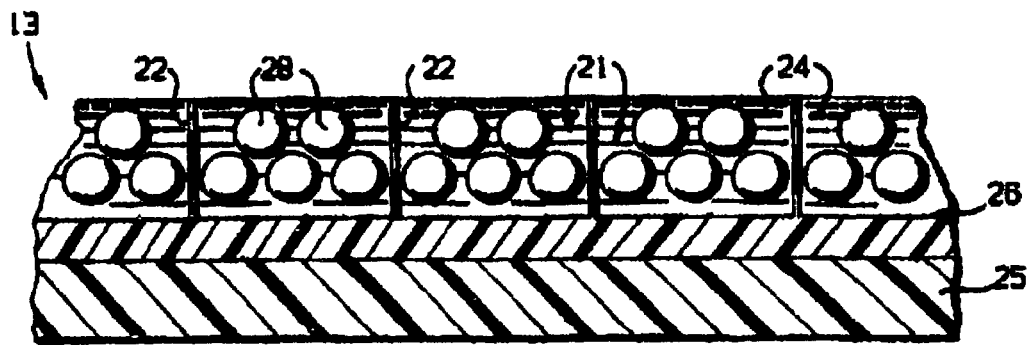

CHEMICAL MECHANICAL POLISHING SLURRY

REFERENCE TO RELATED APPLICATIONS

This is a continuation-in-part (CIP) of U.S. application Ser. No. 10/146,137 filed May 16, 2002 now U.S. Pat. No. 6,676,492, and Ser. No. 09/391,596 filed Sep. 8, 1999 now U.S. Pat. No. 6,458,017, now allowed. The '596 application is a CIP of Ser. No. 09/112,182 filed Jul. 9, 1998 now abandoned. These applications are all hereby incorporated by reference.

BACKGROUND OF THE INVENTION

1. Field. Field

This invention relates to chemical mechanical polishing (CMP), and more particularly to improved chemical mechanical polishing with improved reproducibility, versatility, productivity, robustness, and low cost.

2. Prior Art

CMP is uniquely capable of removing thick metal films while leaving intact features inset and surrounding dielectric films in integrated circuit processing. This process has become an enabling technology for both advanced tungsten plug and copper demanscence processes. It aims to achieve global planarity, and is as crucial as metal deposition or lithography aiming. CMP is no longer a niche application with the same fixed equipment, material, and process for all device designs, material and process selections. In particular, device miniaturization and the coming of multi-metal architectures and techniques such as the emerging copper dual damascene are seriously challenging. These challenges force CMP technology including platforms, chemistries, pads and slurries to rapidly and radically evolve and improve.

Current CMP is not perfect. It must be carefully controlled for it to be optimized. A poorly executed CMP can generate extreme metal dishing in wide structures or dielectric erosion in high-density regions of smaller features. Abrasive particles containing slurries generate scratches or gouges in the inlaid structures. If a substrate is improperly post-CMP cleaned, the slurry particles can be included in subsequent dielectric deposits and depress yield. The process also reveals and highlights preexisting defects such as seams and voids encapsulated in vias and trenches during earlier copper electroplating processes, or delamination of barrier/seed layers from surrounding dielectrics not easily detected in preceding operations. Particles trapped into underlying dielectrics, barrier and seed films will appear only after the metal that coats them is removed. Shifts in film microstructure through the thickness of the deposit may affect CMP rates, or lead to effects such as pull-out of grains causing pits in the surfaces or perimeters of the inlaid metal.

CMP technology including equipment, material and processes cannot meet the needs for metal thinning, planarization and defect elimination. There is no slurry meeting all the CMP requirements. Additional problems exist as to stability and shelf life of the slurry, lot-to-lot variability of slurry products. First-step cannot always stop at the barrier layer. Second-step polish often introduces dishing, erosion, and non-uniformity.

CMP's next challenges include:

1) Adapting to smaller device features and large wafer sizes such as 300 mm;

2) Minimizing defect formation including planarity, metal thinning, nonuniform polishing, erosion, corrosion, pits, delamination, planarization, oxide and total metal loss, scratches, ruptures, topography issues with demascene structures, excessive edge exclusion below 3 mm, too much down-force pressure during CMP especially with copper and ultralow-k dielectric materials, and other damages;

3) Improving slurry stability, uniformity, deterioration during processing, shelf life, and lot-to-lot variability, all customized to possible gel formation and agglomeration of the slurries. Definite knowledge of chemistry and particle interaction, time-sensitive chemicals like an oxidizer, consistent concentration of the delivered slurry or particle density, controlling particle size-distribution in mixed powders and excessive settling associated with certain particles or combination of particles associated with a specific liquid slurry suspension medium, are also needed. These improvements are necessary for rapid development, characterization, and optimization of a specific robust CMP equipment and process for each customer's product.

4) Minimizing copper and oxide loss in double-damascene process;

5) Tailoring and integrating equipment, material, and process to new materials such as low-k films for low cost but with minimum size and complexity, maximum productivity, endpoint control, design flexibility, improved deposition rates, versatility, reliability, and robustness; and 6) Improving slurry stability, uniformity, deterioration during processing, shelf life, and lot-to-lot variability, all customized to possible gel formation and agglomeration of the slurries. Also needed are definite knowledge of chemistry and particle interaction, time-sensitive chemicals like an oxidizer, consistent concentration of the delivered slurry or particle density, controlling particle size-distribution in mixed powders and excessive settling associated with certain particles or combination of particles associated with a specific liquid slurry suspension medium. These improvements are necessary for rapid development, characterization, and optimization of a specific robust CMP equipment and process for each customer's product.

6) Smart processing automation such as with real-time, in-situ monitoring and feed-back control, and computerized R&D for self-optimized process control;

The CMP method of surface planarization is a dominant technology in polishing glass. It also meets planarazation requirements in the <0.35 DM (micron) feature-sized multilevel devices and interconnects in the semiconductor industry. The CMP method is a preferred technology to carry out global planarization for various integrated circuits (IC). Planarized surfaces have become key to the success of advanced semiconductor devices and circuits, particularly for high-density multi-level interconnects.

In IC manufacturing, CMP involves competing requirements at various length scales—e.g., uniform removal at the wafer scale, but non-uniform removal of protruding surfaces or areas to achieve planarization at the feature scale. The process, developed so far through trial-and-error, involves a synergistic interaction of many factors: fluid flow, fluid chemistry, slurry particle materials, surface dissolution, and wafer material.

Ideally, the grinding and polishing method and equipment should provide high uniformity and selectivity, low defect levels, high removal rate, low-pressure/high-speed capability, short product development time, and low cost. Also, the solid grinding/polishing abrasive materials should always remain as sharp as possible, efficient, long-lasting, and low in initial and operating costs for rapid, reproducible grinding and polishing operations.

Grinding, polishing, or planarizing is widely used in many industries such as automotive, electronics optical, machinery, metallurgical, medical, and glass. The quality and performance of an automobile, electronic component, optical instrument, precision machinery, glass plate, metallurgical material, or biomedical samples often critically depend on the cost and quality, e.g., flatness, surface finish, and reproducibility, of the planarized material. A perfectly planarized sample is often too costly or even impossible to obtain.

Making a modern 0.25-micron CMOS IC requires 13 planarizing steps. A single major defect in any one step can result in the rejection of the entire chip lot. Even if each planarizing step has a yield of 99%, the final product yield loss from the 13 planarizing steps alone is over 12.2%. Raising yields from 99% to 99.5% in each of the 13 planarizing steps still incurs a planarizing loss of 6.3%. This is a big production and financial loss.

A planarizing machine is often used to obtain a planar, smooth outer surface on a material. The prior-art grinding and polishing machine often comprises a rotating wheel for mounting the material thereon. A colloidal liquid or liquid abrasive suspension is provided to wet the wheel and to hold/mount the material against the rotating wheel. The planarizing liquid suspension slurry comprises a liquid suspension medium and a plurality of solid abrasive particles suspended therein. The liquid suspension is fed onto the wheel to chemically and mechanically grind and polish off surface layers of the mounted material.

Both manual and automatic planarizing machines have been known in the art for quite some time. But these machines are not satisfactory in many respects. The liquid suspension is costly but is not reproducible; has short shelf lives; deteriorates in performance during use, transit, or even storage; and does not reliably produce quality product results. The solid abrasive particles wear out rapidly degrading the planarizing results. The solid abrasive particles also often agglomerate or break up into smaller pieces. Changes in particle size, e.g., over 10 to 20% over the average size, alone, lead to loss of control of the desired surface finish. A large size distribution of the solid abrasive particles produces a wide variety of surface finishes of differing smoothness and qualities, hampering product yield and reproducibility.

The hard, sharp, and brittle working edges and points on the solid abrasive particles are easily damaged, producing products of variable quality even during the same planarizing run. Damaged or worn-out particles always give inferior results. The planarizing process is then inefficient, costly and nonreproducible.

To overcome the foregoing and other difficulties, the general object of this invention is to protect solid abrasive particles and contact-sensitive parts from damage during their preparation, use, transit, and storage;

Another object of the invention is to provide an improved planarizing liquid slurry that is not only highly effective but longer lasting, and produces high-quality products;

Yet another object of this invention is to minimize damages on the working quality of a planarizing liquid suspension by making the solid abrasive particles practically forever sharp prior to use;

It is another object of the invention is to provide improved planarized surfaces finishes, rapidly and at low cost;

A further object is to greatly improve the material use efficiency of the solid abrasive particles in the planarizing operations.

Another object of this invention is to provide improved CMP methods with enhanced stability, reproducibility, versatility, productivity, robustness, product qualities, and low cost;

Yet another object of the invention is to achieve minimized defects formation, lot-to-lot variability, mixed abrasive particles settling, and deterioration of slurry performance with mixed solid abrasive particles; and A further object of the invention is to provide completely computer-automated self-optimizing CMP operations.

SUMMARY OF THE INVENTION

A liquid suspension for planarizing an outer surface of a material comprises a liquid suspension medium of a specific liquid density; and a plurality of solid, contact-sensitive abrasive particles of a constant solid density and suspended in the liquid suspension medium. The liquid and solid densities are approximately the same so that the abrasive particles freely and stably suspend in the liquid suspension medium, without gravitational separation by settling down or floating up. In this way, damaging contacts of the solid abrasive particles with one another are minimized.

Various other objects and advantages, and a more complete understanding of the invention, will become apparent to those skilled in the art from the following description and claims, taken in conjunction with the accompanying drawings.

BRIEF DESCRIPTION OF THE DRAWINGS

To illustrate the invention, there is shown in the drawing the forms which are particularly preferred. It is understood, however, that the invention is not necessarily limited to the precise arrangements and instrumentalities here shown but, instead, may combine the same described embodiments or their equivalents in various forms.

FIG. 1 shows a vertical section through a part of an improved planarizing equipment; and FIG. 2 is a vertical section through a part of a polishing pad on the planarizing wheel of FIG. 1, specifically showing the pad compartmented pockets containing the individualized solid abrasive particles.

DESCRIPTION OF THE PREFERRED EMBODIMENTS

A principal planarizing problem is the difficulty of maintaining a uniform, high-quality liquid slurry of planarizing suspension. This suspension must be reproducible, not easily damaged and, therefore, longer lasting. A new planarizing suspension is designed to maintain the solid abrasive particles "forever-sharp" during processing, use, transit, or even storage of the liquid abrasive suspensions.

Each of the very fine, micron or nanometer size range solid abrasive particles (typically of $Al_2O_3$ or CeO) has many tiny, rigid, sharp, yet brittle working edges and points on its outer surfaces. The shape, size, perfection, and sharpness of these microscopic planarizing edges and points determine the cost, life, and performance of the planarizing liquid suspension slurry and, in fact, the entire planarizing operation.

During their useful life, the solid abrasive particles, together with their sharp edges and points, continuously touch, contact, impact, and degrade one another. Millions of solid abrasive particles are usually carried in a single slurry suspension bottle, or restricted in a small working area or volume. During movement of the storage bottle or during handling of the liquid abrasive slurry such as feeding onto the polishing wheel, many of the sharp edges and points touch one another or the container wall, sufficiently strongly relative to the thinness and brittleness of these microscopic edges and points. These contacts affect the performance and quality of these solid abrasive particles.

In addition, during the use of the planarizing liquid suspension, the liquid stream containing the solid abrasive particles must be pumped or pushed around intricate pump vanes, vale seats, liquid conduits, and duct walls, making right, left, and Y- or U-turns while simultaneously changing in shape, size, cross-sectional area, velocity, acceleration, and direction.

In the conventional planarizing liquid slurries, the solid abrasive particles have a common average density very different from that of the liquid suspension medium. Abrasive particles settling and segregation occurs due to gravitational and centrifugal fields, and changes occur in velocities, accelerations, and cross-sectional shapes, sizes, and areas. All these greatly multiply the number of direct contracts of the solid abrasive particles.

Differential accelerations, velocities, and movements due to differing densities of solid relative to the liquid suspension medium also cause neighboring solid abrasive particles tp push away the generally lighter, less-accelerating, and slower-moving intervening protective suspension liquid. The resultant direct contact between the neighboring solid particles can damage both particles precisely at the critical tiny and fragile and microscopic working edges and points.

The solid abrasive particles in the liquid slurry fed generally vertically downward onto the polish pad (See FIG. 1) also can touch one another possibly in mid-air, but most probably after reaching the polish pad. The generally heavier solid abrasive particles, stripped bare of any slower-moving or slower-accelerating, protective liquid suspension medium, can then directly contact one another and the polish pad. Once on the polish pad, the slurry droplets flatten, distort in shape, and change their movements, velocities, accelerations or decelerations relative to each other and to the lighter-density liquid protective suspension medium between the particles. Such changes are different even in different parts of the same slurry droplet or stream. More damaging contacts between the brittle working edges and points on the solid abrasive particles again result.

The solid abrasive particles spiral out on the rotating polish pad toward the periphery thereof. More complications again arise due to: liquid splashing, centrifugal force fields, different thicknesses or sizes of the suspension liquid film containing the gravitationally and centrifugally segregated solid particles, and vastly greater contact area of the liquid film relative to the tiny solid abrasive particles with minim bottom contact areas and friction forces on the same pad. All these complications further separate or segregate the solid abrasive particles from their protective liquid suspension medium on their outside surfaces. These condition again cause damages of the working qualities of the abrasive particles and the liquid suspension slurry.

Before reaching the material surface to be planarized, the solid abrasive particles may already be damaged or worn-out. A material use efficiency of significantly less than 100% is therefore expected with the conventional planarizing liquid suspension slurry To preserve the working quality and efficiency of these liquid suspensions, one must pay attention to the millions of microscopic working edges and points on the solid abrasive particles. Specifically, one must minimize the damage by the contacting or impacting neighboring particles during the entire life of these solid abrasive particles.

A new and successful method for this invention is achieved by continuously protecting each of the solid abrasive particles with an inseparable, sufficiently thick, individualized protective or cushioning layer of the colloidal or liquid suspension medium. To achieve this result, the solid abrasive particles must have a common density, $d_s$, sufficiently close to that of the liquid suspension or liquid suspension medium, $d_m$. The solid abrasive particles then suspend freely and stably in the liquid medium, and are always protected and cushioned on all their outer surfaces, where the tiny fragile working edges and points are located.

By selecting, designing, mixing of multiple liquids of differing densities, surface plating of particles, and other means, the liquid suspension medium density $d_m$ may be within 2 to 15%, more preferably within 5–10% but possibly within 2–3%, of the substantially constant solid density $d_s$. The solid abrasive particles thus freely and stably suspend in the liquid suspension medium. Damage to the grinding and plishing qualities of the solid abrasive particles is thus minimized through reduced contacting or impacting of solid abrasive particles on one another, or on another solid surface.

Prefereably, not even a single direct contact between any two neighboring abrasive particles is allowed. During processing, use, transit, or storage of the liquid slurry suspension, there should be little differential movements, velocities, accelerations, forces, or momentum between any two neighboring abrasive particles relative to each other, and between any abrasive particle and the nearest the container wall of the liquid slurry and even to the liquid suspension medium. This is possible with the present invention because both the liquid suspension medium and the solid abrasive particles now have approximately the same densities or masses per given volume, velocity, acceleration, and momentum. Little or no change of liquid suspension shape, size or cross-sectional area occurs. In this way, little or no direct force exchange and momentum transfer between neighboring solid particles are possible. The brittle working edges or points on the solid abrasive particles are then protected.

The density of the liquid suspension medium and that of the solid abrasive particles are now approximately the same. The liquid suspension medium between any two neighboring solid abrasive particles, or between one abrasive particle and the nearly wall of the container or polish pad, is neither appreciably increased nor decreased in thickness thereby constantly providing an effectively protective, cushioning layer of constant thickness between two neighboring particles, or between the one solid abrasive particle and the nearly wall of the container or the surface of the polish pad. According, the sharp and brittle working edges and points on the solid abrasive particles are also permanently protected, because of the absence of excessive contacting or impacting movements and forces.

As a result, the liquid suspension slurry of abrasive particles will have a much longer useful life. The working qualities of the liquid suspension will be nearly the same throughout its life subject, of course, to its actual usage. Low-cost, reproducibly high-quality surface finishes of the planarized parts are then possible even for high-speed operations.

The attached figures show a planarizing machine in a sectional side view with parts removed and other parts shown somewhat schematically. The illustrated planarizer in FIG. 1 has a polishing wheel 11 rotating about a vertical axis in a counter clockwise direction. The polishing wheel 11 and pad 13 rotate at about 30–90 rmp. On the left side of the wheel 11, there is wafer carrier 16 which carries the silicon wafer 15 thereunder via, for instance, a double-sided adhesive tape 14. The wafer is under a downward force or pressure F (See FIG. 1) of from 2 to 9 psi, applied through the stem 17. A slurry 18 of the solid abrasive particles, typically of $Al_2O_3$, is shown feeding the liquid-suspended abrasive slurry 18 in a downward direction onto the polish pad 13 at an off-center point. Note that the stem 17 and the wafer carrier 14 also rotate in a counter clockwise direction, though not necessarily at the same rotational speed. Additional abrasive particles include ceria, diamond, silica, magnesium oxide, quartz, silicon carbide, and combination thereof.

Changes in other slurry properties, such as pH, temperature, slurry particles composition in, e.g., weight percent, slurry stream direction, size and shape, degree of agglomeration, and slurry weight also have profound effects on the polishing chemistry and material removal rates. In oxide CMP at high pH, both dissolving surface material and the slurry particles will have similar, hydrated surface layers.

Peroxide addition greatly affects the removal rate of PN barrier layer material, but only slightly on the aluminum and oxide. CMP of Cu, Ta, and TaN is often done with a slurry containing alumina particles, with the pH controlled by $NH_4OH$. The commonly used oxidizers in CMP are $H_2O_2$, $KIO_3$, $K_3Fe(CN)_6$ and $Fe(NO_3)_3$. The CMP action appears to be dominated by the direct abrasion of the surface film layer by the solid abrasive particles in the slurry.

An oxidizing agent is used to make copper ions on copper material. Organic acid is also used to form a chelate complex of copper in the slurry. The copper is surface oxidized by $H_2O_2$. The oxidized convex layer prevents copper from etching by a glycine/diluted $H_2O_2$ slurry, but is removed by the polishing cloth on the polishing wheel.

CMP process generally is a combined mechanical wear and chemical corrosion process for polishing. In CMP of W (tungsten) surfaces in the presence of 0.5 M $H_2SO_4$, e.g., a little wear occurs with a cathodic potential, but increases with an anodic applied potential. Under highly acidic conditions copper CMP leads to severe corrosion, while under alkaline conditions the copper polishing rate with respective to SiO2 is unfavorable, leading to interlevel dielectric (ILD) erosion. An intermediate pH value of 3–7 is better. Benzotriazole is often used as a corrosion inhibitor.

Many $H_2O_2$-glycine base slurries contain $SiO_2$ or $Al_2O_3$. In these slurries, the copper dissolution rate and polish rate increase with increasing glycine concentration. The dissolution/polish rate increases with increasing $Cu^{++}$ ions and levels off beyond a concentration that depends on the glycine concentration. Both of these rates decrease with increasing $H_2O_2$ concentration, presumably due to the passive CuO film formation. Thus there is a dynamic balance between CuO formation and direct dissolution, apart from the mechanical abrasion during the copper CMP in these slurries.

Surfactants have been added to slurries to stabilize the suspension, to improve wafer to wafer and within wafer uniformity, to decrease defects, and to enhance post-polish cleaning. All nonionic surfactants enhance stability in basic slurries, while the more soluble surfactants are effective in acidic ones. The ionic surfactants are even more effective than the nonionic surfactants at enhancing slurry stability.

Alkaline solution based on $NH_4OH$ is traditionally used in post-CMP cleaning. Tetramethyl $NH_4OH$ (TMAH) based chemicals reduce corrosion, especially at pH values higher than 10. Even in $H_2O_2$, TMAH corrodes copper at a lower rate than $NH_4OH$. The addition of a nonionic surfactant to the TMAH solution reduces copper corrosion significantly.

In oxide CMP for integrated circuits, it is critical to have a uniform post-polish thickness within and across wafers to minimize and maintain a low level of dishing and erosion, and to maintain the correct line resistance and interlevel or intralevel capacitance. The oxide erosion increases with high pattern density.

High-density IC areas slow down the CMP process, more than areas with isolated patterns. This is partly due to the dynamic load applied to the feature by the polish pad. Improper CMP produces residual subsurface damage in the polished silicon wafers. Such damage degrades the gate oxide integrity in metal-oxide-semiconductor devices.

Some liquid suspension slurries contain chemicals that are stress-corrosive relative to the outer surace of the planarized material. If the material to be planarized is steel, for example, the stress-corrosive agent may be an inorganic acid such as weak nitric or sulfuric acid. This additive material improves the planarizing speed and productivity, and even the surface finish of the planarized material.

The solid abrasive particles also have marked effects. The polish rate increases significantly only when the abrasive particle concentration exceeds a threshold value. This value correlates with the measured hardness of the thin films to be polished. The particle size critically controls the polishing rate and surface roughness during CMP of the IC interconnects. The tungsten removal rate increases with decreasing size and increasing particle concentration. This suggest that the removal rate mechanism is not a scratching type process, but may be related to the contact surface area between the abrasive particles and polished surface. The increasing damage measured as depth of scratches on dielectrics is a function of the particle size.

Colloidal $SiO_2$ or $Al_2O_3$ particles do not change in particle sizes as a function of slurry pH, but fumed silica particles change at lower pH ranges. Increase of size in fumed silica may be attributed to segregation and agglomeration of particles. The reduced direct contacting effect between the solid abrasive particles in the present invention should minimize such agglomeration of particles.

The material removal rate in CMP operations starts slowly, rises rapidly, and levels to an equilibrium value after about 40 seconds. This is ascribed to an increased temperature due to surface change, e.g., oxidation or conversion of copper to copper oxide, and frictional heat at the polishing interfaces. The new pad design of this invention will further insure uniform and reproducible processes of the friction or oxidation and hence, the polishing operation itself.

The present method leads to savings in solid abrasive particles and to a high abrasive material use efficiency compared to conventional CMP procedures. The solid abrasive particles in the new planarizing process are consumed only during their actual use in the very planarizing step itself, for reasons above explained. The invented method also has better control of the abrasive particle size distribution in the planarizing operation. Without much direct contact and self-damage, much or nearly all the solid abrasive particles will retain their original sizes and shapes, with reproducibly forever-sharp nascent working edges or points thereby insuring low-cost, uniform planarizing operations to achieve rapidly very find surface finishes, run after run and wafer after wafer.

The slurry stream may be delivered with the usual liquid pressures, nozzle diameters, and spacings of the nozzle from the surface of the polishing wheel. In the new planarizing machines, the polish pad is placed within 2 to 6 inches below the nozzle tip. The polish pad 13 has a top portion having many laterally spaced, compartmented pockets 21. Each of these compartmented pockets stores a relatively fixed number of the nascent ever-sharp abrasive particles 28. Neighboring compartment pockets 21 are separated by compartment walls 22. The compartment pockets serve to protect the solid abrasive particles 28 contained therein from being damaged by outside objects including the slurry 18 itself and by the other solid abrasive particles flying wildly around. These compartment pockets also keep enough of the suspension liquid medium therein to protectively cover the sharp but brittle working edges or points on each solid abrasive particle.

The material removal rate depends on the rotational speed of the polish pad, pressure on the pad, slurry flow rate, and other parameters. Variations in pad structure and material properties including bulk, pores, and surfaces greatly affect the CMP performance. But the reasons are not well understood. Increase pad hardness improves the control of oxide erosion.

As shown in FIG. 2, the top polish pad of the invention is made of a resilient material and has its upper section 26 divided into a plurality of laterally spaced, segmented pockets 21 with open tops. Polyurethane plastics, widely used for polish pads in the glass industry, can also be used in this invention. The colloidal liquid suspension in the slurry fills the segments pockets and wets the rotating pad so as to hold and mount the material against the rotating polish pad 13. The freely and stably suspended solid abrasive particles in the liquid suspension medium have nascent, sharp but brittle working edges and points on their outer surfaces for planarizing material surfaces. These planarizing edges and points are easily damaged. In this invention, however, these same working edges and points are fully protected by the minimized direct contacting of the solid abrasive particles 28 inside each segmented compartment pockets 21 on one another and also onto the compartment pocket walls.

The polish pad 13 is made of a resilient material. This material also forms the compartment walls 22 separating the neighboring compartment pockets 21. During planarizing a downward pressure F of generally 2 to 9 psi is temporarily applied through the stem 17 to the top pad material to sufficiently compress the resilient side walls 22 between the segmented pockets 21. The downward temporary compression of the compartment walls 22 exposes the silicon wafer 15 to the rigid, sharp, but brittle edges or points on the abrasive particles 28 contained in the pockets 21. The temporarily exposed solid abrasive particles remove the wafer surface material chemically, or by mechanical action of the pressurized solid abrasive particles on the rotating wafer. Upon releasing the downward pressure, the compartment walls immediately return to better contain or protect the solid abrasive particles in the various compartmented pockets 21.

The new segmented pockets 21 have several functions: 1) minimize loss of the solid abrasive particles 28 and the intervening fluid suspension medium 24 contained in the pockets so that the particles are no longer simply lying on the rotating wheel ready to slide or spiral off the pad; 2) minimize damaging contacts of the rigid, sharp but fragile working edges and points on the solid abrasive particles 28; 3) maintain uniform abrasive particle size distribution necessary for reliably uniform smooth surface finish on the planarized material; 4) provide a cleaner working environment; and 5) synchronizing the angular velocities of the polish pad with those of the solid abrasive particles 28 at a constant rotation speed of the polishing wheel, at different times and pad locations, making the polishing actions on the wafer uniform and reproducible.

The location and movement of the solid abrasive particles are thus highly controlled, while the liquid suspension medium must stay put and work with the solid abrasive particles 28 to perform the necessary CMP process. More uniform polishing action of the invention arises for another reason. The centrifugal force and acceleration on the abrasive particle varies with the radial location on the pad, causing uneven motion of the particles on the rotating pad. A compartmented pad structure of the invention restricts the movements of the abrasive particles on the pad and provides a more uniform particle size distribution.

An important design feature for this new planarizing technology is to select the micron (i.e., 0.1 to 1.0 um) or nanometer (i.e., $10^{-5}$ to $10^{-5}$ meter) size range solid abrasive particles and the liquid suspension medium to have approximately the same density. The usual solid abrasive particles include: $Al_2O_3$, $SiO_2$, ceria, SiC, diamond, MgO, and PbO or combination thereof having densities of 4.0, 2.65, 3.9, 3.21, 3.53, 3.65, and 3.97, respectively.

Liquid suspension media may vary in density from less than 3 to 11 grams/cc and more, as shown below. These liquid suspension media may be within 10 or 20% of the density of the above-listed or other solid abrasive particles, or even substantially the same (i.e., within 2–5% of the solid particles density). Various miscible liquids of different densities may, of course, be mixed together in different proportions; or diluted with various solvents to achieve desirable, or even exactly the same, densities. These liquids may thus be fine-tuned in volume or weight proportions to get any exact required density as needed subject, of course, to constraints such as unwanted chemical reactions, environment safety, and the desired use temperatures.

Useful liquid suspension medium include, according to Lange's Handbook of Chemistry, J. S. Dean, McGraw Hill, New York 1992: fluorine perchlorate (density) 4.95, (melts at −187.3° C.); HBr 3.39 (−97.5° C.); HI 5.37 (−30.8° C.); $H_2Te$ 6.234 (−49° C.); $IBr_2$ 4.42 (40° C.); $IF_5$, 3.21 (9.43° C.); $PF_3$, 3.91 (−151° C.); $ReF_6$ 3.38 (18.5° C.); $SbF_5$ 2.99 (7.0° C.); $BiI_3$ 3.35 (50° C.); $GeBr_4$ 3.13 (26.1° C.); HI 5.37 (−50.8° C.); and $RuO_4$ 3.29 (25.4° C.). Also, $SnBr_4$ with density of 3.35 (melting at 30° C.), is soluble in hydrochloric and acetic acids; and tribromomethane $CHBr_3$ 2.90 (18.5° C.) is soluble in MeOH and ethyl alcohol. Other solubility data are also given in the Lange's Handbook. These solubility data help in preparing the liquid suspension media; in deciding when a given liquid suspension medium must be diluted with another solvent; or when two, three or more different liquid suspension media must be used together to produce a single mixed solution of a desired density.

Other suitable liquid suspension media may be selected from other Chemistry handbooks or reference books on organic or inorganic chemistry. Pure Hbr, $IBr_2$, $PF_3$, $ReF_6$, $BrF_3$, HBr, and $SnBr_4$, therefore, may be used to prepare the liquid suspension slurry containing $Al_2O_3$ abrasive particles. These same suspension media can also be mixed with other liquid suspension media mentioned above to achieve better or even exact density matches between them and the solid abrasive particles.

According to G. L. Skipp and I. Brownfield in U.S. Geological Survey Report 92–386, 1992, on "Improved Density Gradient Separation Techniques", Sodium Polytungstate, $3Na_2WO_4 9WO_3.H_2O$ (SPT) can be mixed with water to form a liquid with a fluid density that can be adjusted from pure water with a density of 1 g/cm$^3$ to a saturated solution with a density of 3.10 g/cm$^3$. Unlike the above chemical compounds involving Br, F, I, H, the SPT solutions are not toxic and can be handled without the use of a fume hood and personal protective equipment. SPT is hydrophilic improving the wettability of mineral grains, such as alumina (density 4.0) and ceria (density 3.9). The SPT solutions have a maximum density of 3.1, and is still over 25.8% and 29.0% less than those of ceria and alumina. But these solutions are much better than that of water in aqueous CMP slurries and could be used for marked improvement over the common aqueous slurries with respect to gravitational settling of the solid abrasive particles.

Further, for solid abrasive particles with densities of less than about 3.2, such as SiO$_2$, SiC, diamond, and MgO, the SPT can form excellent liquid suspension medium for the new CMP slurries.

The liquid suspension slurry may contain only one type of solid abrasive particles. In this case, it is highly desirable to have these particles suspended in an approximately equal-density liquid suspension medium. A plurality of solid abrasive particles may also be used in a CMP slurry.

Two solid abrasive particles with different densities, such as alumina and ceria with densities of 4.00 and 3.90, respectively, are often used together to grind and polish a substrate silicon. Li is his U.S. Pat. No. 5,874,175 patent (at column 6, lines 33–54 and column 7, lines 28–36) gives, for a given single solid suspended particle, its unique velocity constant. This velocity constant characterizes the settling behavior of the particle in a fluid suspension medium, and is given by the following equation:

$$v=(d_s-d_1)g/18n,$$

where s is the solid particle size, g the gravitational constant, and $d_s$ the density of the solid particle suspended in a liquid suspension medium of density $d_1$ and viscosity n.

For example, one can thus calculate the velocity constants, v, and the settling behavior in water at 20° C. ($d_1$=1.0, n=0.020) of various solid spherical particles, with particle density d in g/cc:

$$v=5,440 \times (d_s-1)$$

Mixed solid alumina (density $d_{s1}$=4.00, size $s_1$) and ceria (density $d_{s2}$=3.90 and size $s_2$) particles suspended in a water suspension (density $d_1$=1.0 and viscosity n=0.010). Te velocity constants calculated according to the above equation are 16,300 and 15,800 for alumina and ceria spherical particles, respectively. If we mix the alumina and ceria powders in the size ratio of, $d_{s1}/d_{s2}$ according to the square root of the velocity constant ratio (16,300/15,800==1.03), i.e., 1.01, the final settling velocities of both these size-ratioed powders will be exactly the same.

Because the velocity constant ratio of alumina and ceria abrasive particles in a water suspension medium (density $d_1$=1) is very close to one, i.e., 1.03, one can use equal-sized alumina and ceria abrasive particles and still get practically the same final settling velocities differing by only 1% from each other. That is, by simply making the heavier alumina powders merely 1.0% smaller in sizes than the ceria powders, the mixed alumina/ceria powders in an aqueous (density $d_1$=1.0=1.0) solution suspension will finally settle out in the water medium at 20° C. at exactly the same velocity. Gravitational segregation of these two mixed alumina/ceria powders is then totally eliminated during the final stages of the CMP process. This condition leads to some uniformity in the CMP results due to the uniform composition of the finally deposited layers of mixed alumina and ceria. Global planarity ad CMP uniformity is then also facilitated.

While the alumina/ceria combination have very close densities and, therefore, does not gain much in equal-settling. Other combinations of abrasive particles may have large density ratios so that the use of the above formula may help in achieving more uniform composition of mixed abrasive particles in a later part of the CMP processes.

One can also use a single PF$_3$ liquid suspension medium having a density of $d_1$=3.91 and a melting point of –151° C., as shown above. In this case, the ceria particles have a density of $d_{s2}$=3.90 which is only –0.256% less than the PF$_3$ liquid suspension medium with density $d_1$=3.91, while the alumina particles have a density $d_{s1}$=4.00 which is only +2.56% greater than the same PF$_3$ liquid suspension medium density $d_1$=3.91.

Three or more mixed powders can, in a similar manner, also be used to size-ratio with respect to their densities so that they all will finally settle out at the same velocity.

As usual, input parameters such as polish pad design, pad type, slurry type, polishing pressure, temperature, backside pressure, and pad speed should be carefully controlled, preferably automatically through modern automation techniques for, for example, the endpoint of the CMP process. Output parameters such as material removal rate, change in removal rate time (an important indicator of solid abrasive material use efficiency), within wafer uniformity, wafer to wafer uniformity, surface planarity, and planarizing defects including embedded tiny particles and scratches must also be continuously monitored and controlled. Other important performances to be monitored and controlled include: local and global uniformity, within die, within wafer, and wafer to wafer surface finishes qualities, high productivity and wafer throughout; mean time between machine failure; abrasive slurry use rate, process repeatability; and defect types, content, and regularity. Non-contact electro-optical monitoring is often preferred, particularly for direct real-time inputting the monitored data into a process control computer.

Because CMP is an extremely complex process involving many phenomena, materials, processing steps, and equipment variables, comprehensive experimentation has never been conducted. Hence, there is no useful knowledge base to design and set the optimal operating conditions for a particular, or any, CMP process. An optimum CMP operation depends on many variables. Some, not all, of these variables have been mentioned above. Automatic computerized optimizing R&D experimentation techniques must, therefore, be used.

Accordingly, it is recommended that Li';s method for automatic Development of Computer Software, U.S. Pat. No. 6,144,954, be applied to the CMP equipment. Specifically, the improved CMP equipment is provided with:

a) sensing means for sensing in real-time equipment operating conditions and the progress of the CMP operation particularly the end point;

b) computer means for computerized automatic R&D to determine, in real time, an optimum processing CMP procedure for a specific CMP process under given conditions, constraints, and optimizing requirements;

c) feed-back means for close-loop feed back control; and d) means for automatically determining in real time an individualized optimum processing CMU procedure.

All these steps are done by a computer with little or no human control, supervision, and guidance. Automatic computerized R&D must be used because the complexity of the CMP process as explained above, the very large number of parameters control variables involved and the very huge number of tests normally required due to combinatorial explosion of very large number of control variables, and because humans are too slow, biased, and unreliable to handle modern complex CMP processes and equipment.

The following applications and patents are incorporated into this application for CMP method:

1. U.S. Pat. No. 6,286,206 on "Heat-resistant Electronic Systems and Circuit Boards";
2. U.S. Pat. No. 6,144,954 on "Automatic Development of Computer Software";
3. U.S. Pat. No. 5,874,175 on "Ceramic Composite"; and
4. U.S. Pat. No. 6,413,589 on "Ceramic Coating Method".

The invention, as described above, is not to be construed as limited to the particular forms disclosed herein, since these are to be regarded as illustrative rather than restrictive. For example, magnesia, silicon carbide, ceria, iron or lead oxide and other solid abrasive particles of varying composition, sizes, and shapes (such as plates, cubes, or ellipsoids) may be used, instead of the usual nanometer or micron, spherical powders. Further, the same principle of protective or cushioning, ever-present and zero acceleration liquid suspension layer relative to the abrasive particles, can be used not just for protecting the hard, sharp, but fragile working edges or points on the solid abrasive particles, but for other solid objects or articles of manufacture including knives, tool bits, jewelry, precision machine components, delicate components and instruments, contact-sensitive parts, materials, or components, delicate instruments or equipment, and impact-sensitive electronics, microelectromechanical systems such as microrobotics, as shown in Li's prior pending applications.

What is claimed is:

1. A planarizing liquid suspension for planarizing an outer surface of a material comprising:
    a liquid suspension medium of a specific liquid density; and
    a plurality of solid abrasive particles of a substantially constant solid density and suspended in said liquid suspension medium;
    said suspended solid abrasive particles having rigid, sharp, and performance-degradable working edges and points on the outer surfaces thereof for planarizing the outer surface of the material; and
    said substantially constant solid density of the abrasive particles being sufficiently close to said specific liquid density whereby at least a majority of the plurality of said solid abrasive particles freely and stably suspend in the liquid suspension medium, without gravitational separation by settling down or floating up, thereby minimizing damaging contacts of said solid abrasive particles with one another or with another solid object.

2. The planarizing liquid suspension of claim 1 in which said working edges and points on said solid abrasive particles are protected from being damaged by the reduced contacting of the stably suspended solid abrasive particles with one another.

3. The planarizing liquid suspension of claim 1 in which said sufficiently close solid and liquid densities minimize differential movements, velocities, accelerations, or forces between any two neighboring solid abrasive particles relative to each other, because the liquid suspension medium and the solid abrasive particles have approximately the same density, mass per unit volume, velocity, and acceleration whereby there is little direct force exchange and momentum transfer between said two neighboring solid abrasive particles.

4. The planarizing liquid suspension of claim 1 in which the substantially constant solid density of the abrasive particles is within a specified percentage of the specific liquid density;
    said specified percentage being selected from the group consisting of 2%, 5%, 10%, 15%, and 20%.

5. The planarizing liquid suspension of claim 1 in which the substantially constant solid density of the abrasive particles is approximately the same as the specific liquid density.

6. The planarizing liquid suspension of claim 1 in which the liquid suspension medium is chemically corrosive relative to the outer surface of the material to thereby at least partly planarize said outer surface of the material by chemically removing a surface layer thereof.

7. The planarizing liquid suspension of claim 1 in which the material is a solid state material for use in a solid state device.

8. The planarizing liquid suspension of claim 1 in which the material is a semiconductor material for use in a semiconductor device; and
    the semiconductor material is selected from the group consisting of Si, Ge, GaAs, InP, InAs, SiC, diamond, superconductor, and mixture thereof.

9. The planarizing liquid suspension of claim 1 in which said working edges or points on each solid abrasive particle is normally easily damaged but here is protected from damage by an ever-present liquid film of said liquid suspension medium.

10. The planarizing liquid suspension of claim 9 in which said ever-present liquid film of the liquid suspension medium has a time-independent, substantially constant thickness on a specified surface region of each said solid abrasive particle.

11. The planarizing liquid suspension of claim 1 in which:
    the plurality of said solid abrasive particles all have sizes within a specified percentage of a common average particle size; and
    said specified percentage being selected from the group consisting of 10, 5, and 2.5%.

12. The planarizing liquid suspension of claim 1 in which said plurality of the solid abrasive particles are of at least two different types having at least two substantially different densities;
    one of the at least two different types of said solid abrasive particles has a substantially constant solid density which is within a specified percentage of the specific liquid density;
    said specified percentage being selected from the group consisting of 2%, 5%, 10%, 15%, and 25%.

13. The planarizing liquid suspension of claim 1 in which said liquid suspension medium has a density substantially different from that of pure water of one gram per cubic centimeter.

14. The planarizing liquid suspension of claim 1 in which said liquid suspension medium has a density higher than a value selected form the group consisting of 2, 2.5, 3, and 3.5.

15. The planarizing liquid suspension of claim 1 in which said liquid suspension medium comprises a metal selected from the group consisting of W, Mo, Pd, Au, Pt, Pu, Ag, and Pb.

16. The planarizing liquid suspension of claim 1 in which said liquid suspension medium is nontoxic, and can be handled without a fume hood and personal protection equipment.

17. The planarizing liquid suspension of claim 1 in which the liquid suspension medium continuously protects each of said liquid-suspended, solid abrasive particles with an inseparable, sufficiently thick, and individualized protective or cushioning layer of the liquid suspension medium.

18. The planarizing liquid suspension of claim 1 including therein a surfactant to achieve at least one of results selected from the group consisting of stabilizing the liquid suspension; improving within-wafer uniformity; improving wafer-to-wafer uniformity; decreasing defects; and enhancing post-processing cleaning.

19. The planarizing liquid suspension of claim 1 in which each of the solid abrasive particles consists essentially of a material selected from the group consisting of $Al_2O_3$, CeO, $SiO_2$, SiC, diamond, MgO, and PbO.

20. The planarizing liquid suspension of claim 1 in which the solid abrasive particles have sizes no more than microns or nanometers.

21. A planarizing liquid suspension for planarizing an outer surface of a material comprising:
a liquid suspension medium of a specific liquid density; and
a plurality of solid abrasive particles of a substantially constant solid density and suspended in said liquid suspension medium;
said suspended solid abrasive particles having rigid, sharp, and performance-degradable working edges and points on the outer surfaces thereof for planarizing the outer surface of the material; and
said substantially constant solid density being approximately close to or the same as said specific liquid density so that said solid abrasive particles freely and stably suspend in said liquid suspension medium without significant gravitational settling and separation, whereby differential acceleration, velocity, and movement due to differing densities of said solid abrasive particles and said liquid suspension medium are minimized.

22. A planarizing liquid suspension of claim 21 including a respective ever-present protective and cushioning layer of said liquid suspension medium having a fairly time-independent thickness all around each solid abrasive particle to prevent its direct contact with another solid object thereby protecting the rigid, sharp, and performance-degradable working edges and points on each said solid abrasive particle.

23. A planarizing liquid suspension of claim 21 in which said approximately close or the same solid and liquid densities cause said liquid suspension medium between any two neighboring solid abrasive particles to be neither reduced nor increased appreciably in thickness thereby constantly providing an effective cushioning and protective layer between these two neighboring solid abrasive particles.

24. A planarizing liquid suspension of claim 21 in which said approximately close or the same solid and liquid densities cause said liquid suspension medium between any one solid abrasive particle and a nearby solid object to be neither reduced nor increased appreciably in thickness thereby constantly providing an effective protective and cushioning layer of the liquid suspension medium between the one solid abrasive particle and the nearly solid object.

25. A planarizing liquid suspension of claim 21 including a respective protective and cushioning layer of said liquid a suspension medium having a fairly time-independent thickness around each solid abrasive particle to prevent its direct contact with another solid object thereby improving material use efficiency; enhancing CMP processing uniformity; minimizing defects formation; and reducing CMP processing cost.

26. A planarizing liquid suspension of claim 21 in which each of said solid abrasive particles is substantially insulated from outside vibration, shock, movement, velocity, acceleration, force, and momentum by a completely surrounded, nearly equal-density liquid suspension medium.

27. A planarizing liquid suspension of claim 21 in which each of said solid abrasive particles is continuously covered, prior to its actual use in CMP processing, by a protective and cushioning surface layer of said liquid suspension medium.

28. A planarizing liquid suspension of claim 27 in which said covering protective and cushioning surface layer, while continuously present on a respective solid abrasive particle prior to actual CMP process, is temporarily removed to expose locally said rigid, sharp, and performance-degradable working edges and points on the respective solid abrasive particle to said material for removing the outer surface of the material.

29. A planarizing liquid suspension of claim 21 in which said plurality of the solid abrasive particles all have sizes within 10% of a common average size.

30. A planarizing liquid suspension of claim 21 in which the liquid suspension medium continuously protects each of said liquid-suspended, solid abrasive particles with an inseparable, sufficiently thick, and individualized protective or cushioning layer of the liquid suspension medium.

31. A planarizing liquid suspension of claim 21 including therein a surfactant to achieve at least one of results selected from the group consisting of stabilizing the liquid suspension; improving CMP processing uniformity; decreasing defects; and enhancing post-polishing cleaning.

32. A planarizing liquid suspension of claim 21 in which each of the solid abrasive particles consists essentially of a material selected from the group consisting of $Al_2O_3$, CeO, $SiO_2$, SiC, diamond, MgO, and PbO.

33. A planarizing liquid suspension of claim 21 in which the solid abrasive particles are no more than microns or nanometers in sizes; and
the density of said liquid suspension medium differs from the substantially constant solid density by no more than a value selected from the group consisting of 2%, 5%, 10%, and 15%.

34. A planarizing liquid suspension of claim 21 in which the material is a semiconductor material selected from the group consisting of Si, Ge, GaAs, InP, InAs, SiC, diamond, superconductor, and a mixture thereof.

35. A planarizing liquid suspension of claim 21 in which:
the plurality of said solid abrasive particles all have sizes within a specified percentage of a common average particle size; and
said specified percentage is selected from the group consisting of 10, 5, and 2.5%.

36. A liquid suspension of claim 21 in which said liquid suspension medium has a density higher than a value selected form the group consisting of 2, 2.5, 3, and 3.5.

37. A liquid suspension of claim 21 in which said liquid suspension medium comprises a metal selected from the group consisting of W, Mo, Pd, Au, Pt, Pu, Ag, and Pb.

38. A liquid suspension comprising:
a liquid suspension medium of a specific liquid density; and
a plurality of solid objects of a substantially constant solid density and suspended in said liquid suspension medium;

performance of each of said suspended solid objects being sensitive to damage by contact and impact with another solid surface;

said specific liquid density being approximately close to, or the same as, the substantially constant solid density whereby said plurality of the solid objects freely and stably suspend in the liquid suspension medium without contacting and impacting any solid surface thereby preserving performance of said liquid-suspended solid objects.

39. A liquid suspension of claim 38 wherein said solid objects are selected from the group consisting of abrasive particles, knives, tool bits, jewelry, delicate components, contact-sensitive parts, delicate instruments or equipment, impact-sensitive materials or apparatus, and mixtures thereof.

40. A liquid suspension of claim 38 in which said liquid suspension medium is an aqueous solution.

41. A liquid suspension of claim 38 in which said liquid suspension medium is non-toxic, and can be handled without a fine hood and personal protective equipment.

42. A liquid suspension of claim 38 in which each of said solid objects has working edges or points which are normally easily damaged but here are protected from damage by ever-present liquid films of said liquid suspension medium.

43. A liquid suspension of claim 42 in which each of said ever-present liquid films of the liquid suspension medium has a substantially time-independent thickness on specified surface regions of the solid objects.

44. A liquid suspension of claim 38 in which:
the plurality of said solid objects all have densities within a specified percentage of a common average density; and
said specified percentage being selected from the group consisting of 10, 5, and 2.5%.

45. A liquid suspension of claim 38 in which said plurality of the solid objects are of at least two different types having at least two substantially different densities; and
one of the at least two different types of said solid objects has a substantially constant solid density which is within a specified percentage of the specific liquid density;
said specified percentage being selected from the group consisting of 2%, 5%, 10%, 15%, and 25%.

46. A liquid suspension of claim 38 in which said liquid suspension medium comprises a metal selected from the group consisting of W, Mo, Pd, Au, Pt, Pu, Ag, and Pb.

47. A liquid suspension of claim 38 in which said liquid suspension medium has a specific liquid density substantially higher than a value selected form the group consisting of 2, 2.5, 3, and 3.5.

48. A liquid suspension of claim 38 including therein a surfactant to achieve at least one of selected from the group consisting of stabilizing the liquid suspension; improving processing uniformity; decreasing defects; and enhancing post-processing cleaning.

* * * * *